United States Patent [19]

McCabe et al.

[11] Patent Number: 5,121,769
[45] Date of Patent: Jun. 16, 1992

[54] SOLENOID OPERATED PRESSURE REGULATING VALVE

[75] Inventors: Ralph P. McCabe, Troy; Robert O. Koch, Warren, both of Mich.

[73] Assignee: Coltec Industries Inc., New York, N.Y.

[21] Appl. No.: 707,658

[22] Filed: May 30, 1991

[51] Int. Cl.$^5$ .................................... F15B 13/043
[52] U.S. Cl. ........................ 137/625.61; 137/547; 137/55 D; 137/625.64
[58] Field of Search ............. 137/547, 55 D, 625.61, 137/625.64

[56] References Cited

U.S. PATENT DOCUMENTS

| | | | |
|---|---|---|---|
| 2,267,515 | 12/1941 | Wilcox et al. | 137/625.65 |
| 2,868,494 | 1/1959 | Kearns, Jr. et al. | 251/129.14 |
| 2,896,588 | 6/1959 | Hayner et al. | |
| 3,285,285 | 11/1966 | Bielefeld | 137/625.65 |
| 3,307,585 | 3/1967 | Schilling et al. | 137/625.27 |
| 3,349,801 | 10/1967 | Grundmann | 137/627.5 |
| 3,430,656 | 3/1969 | Hawk | 137/625.61 |
| 3,498,330 | 3/1970 | Paige | 251/129.21 |
| 3,521,854 | 7/1970 | Leiber et al. | 251/129 |
| 3,529,620 | 9/1970 | Leiber | 281/129.18 |
| 3,651,833 | 3/1972 | Piko | 137/625.65 |
| 3,789,735 | 2/1974 | Tam et al. | 91/1 |
| 3,828,818 | 8/1974 | Hunt | 137/625.65 |
| 3,856,047 | 12/1974 | Takayama | 137/625.61 |
| 4,009,250 | 4/1981 | Kline et al. | 137/596.17 |
| 4,312,380 | 1/1982 | Leiber et al. | 137/625.65 |
| 4,320,781 | 3/1982 | Bouvet et al. | 137/625.65 |
| 4,338,966 | 7/1982 | Smith | 137/625.65 |
| 4,391,292 | 7/1983 | Millar | 137/596.17 |
| 4,507,707 | 3/1985 | Willis | 361/380 |
| 4,513,780 | 4/1985 | Evans | 137/625.65 |
| 4,522,371 | 6/1985 | Fox et al. | |
| 4,538,643 | 9/1985 | Goedecke | 137/625.64 |
| 4,556,085 | 12/1985 | Warrick | 137/625.65 |
| 4,567,910 | 2/1986 | Slavin et al. | 137/82 |
| 4,578,662 | 3/1986 | Slavin | 137/625.65 |
| 4,579,145 | 4/1986 | Leiber et al. | 137/625.65 |
| 4,610,267 | 9/1986 | Beck et al. | 137/596.17 |
| 4,655,249 | 4/1987 | Livet | 137/625.5 |
| 4,674,613 | 6/1987 | Sikorski | 192/52 |
| 4,678,006 | 7/1987 | Northman | 137/596.17 |
| 4,711,265 | 12/1987 | Davis et al. | 251/129.21 |
| 4,718,454 | 1/1988 | Appleby | 137/625.65 |
| 4,756,331 | 7/1988 | Stegmaier | 137/271 |
| 4,785,848 | 11/1988 | Leiber | 137/596.17 |
| 4,861,068 | 8/1989 | McCabe | 280/714 |
| 4,875,501 | 10/1989 | Ichihashi et al. | 137/625.61 X |
| 4,913,189 | 4/1990 | Kline et al. | 137/884 |
| 4,917,150 | 4/1990 | Koch et al. | 137/625.65 |
| 4,932,439 | 6/1990 | McAuliffe, Jr. | 137/625.65 |
| 4,966,195 | 10/1990 | McCabe | 137/625.64 X |
| 4,998,559 | 3/1991 | McAuliffe, Jr. | 137/596.17 |
| 5,060,695 | 10/1991 | McCabe | 137/625.61 |
| 5,062,454 | 11/1991 | Ichihashi et al. | 137/625.61 |

FOREIGN PATENT DOCUMENTS

| | | |
|---|---|---|
| 1157871 | 11/1963 | Fed. Rep. of Germany ......... 137/625.65 |
| 1100189 | 9/1955 | France . |
| 543767 | 5/1956 | Italy ......... 137/596.17 |
| 294989 | 4/1971 | U.S.S.R. ......... 137/625.65 |
| 316075 | 11/1971 | U.S.S.R. ......... 137/625.65 |
| 469852 | 8/1975 | U.S.S.R. ......... 137/596.17 |

Primary Examiner—Gerald A. Michalsky
Attorney, Agent, or Firm—Howard S. Reiter

[57] ABSTRACT

A pressure control device, preferably for use in a control system of an automatic transmission of a motor vehicle, is shown as having a solenoid motor assembly the armature of which, through a cooperating servo orifice, is effective for varying the magnitude of pressure of a fluid medium acting upon a spool slave-like valving member which ultimately provides a fluid medium to associated fluid medium receiving structure; a fluid medium flow restriction formed as of sintered metal enables the fluid medium to flow in and through the control device to thereby bring about purging of air and other gases from within said control device.

18 Claims, 1 Drawing Sheet

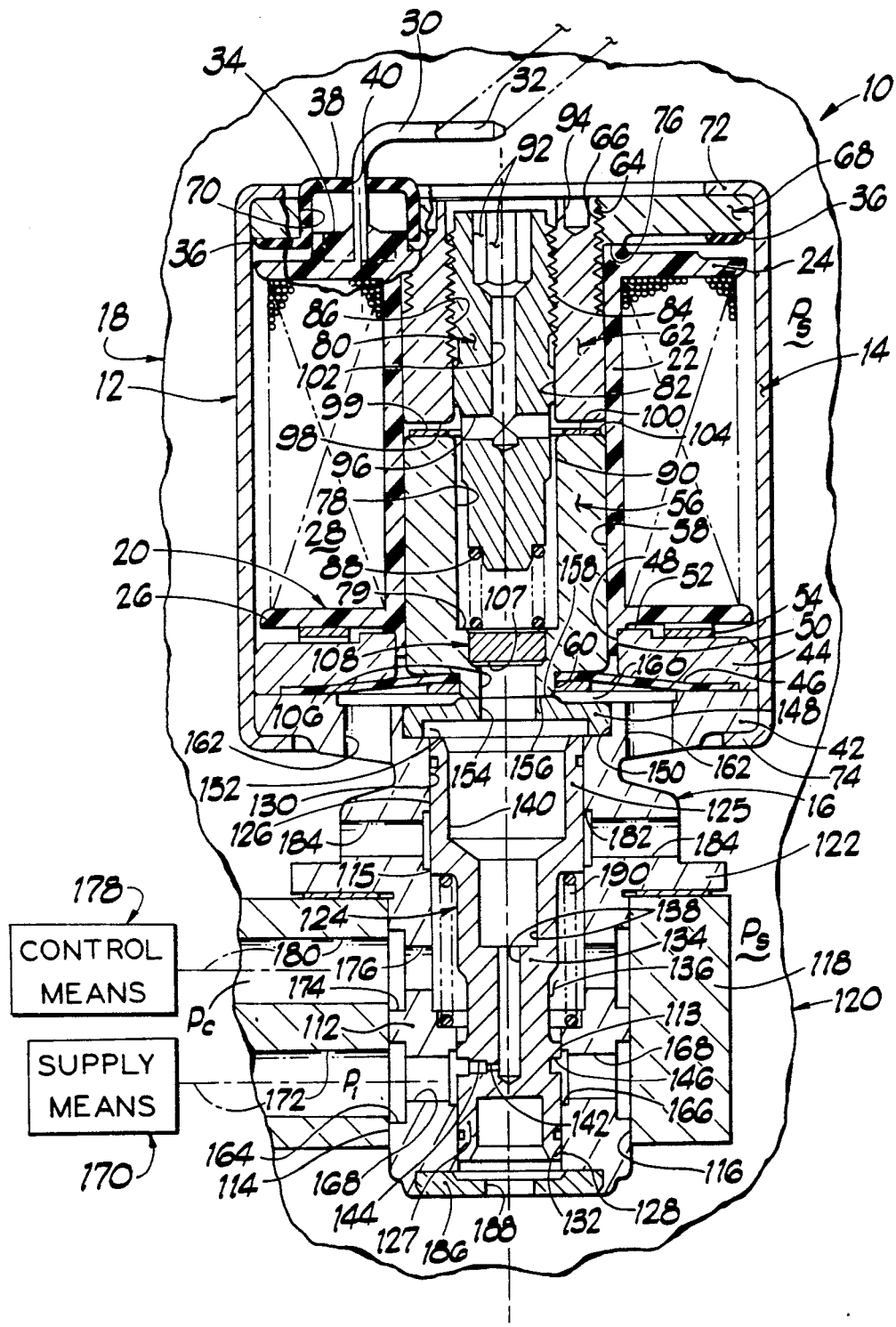

SOLENOID OPERATED PRESSURE REGULATING VALVE

FIELD OF THE INVENTION

This invention relates generally to pressure control devices for regulating the pressure of a fluid medium and employable, for example, in a control system of an automatic transmission of a motor vehicle.

BACKGROUND OF THE INVENTION

Heretofore the prior art has proposed various pressure control devices for use in a control system of an automatic transmission of an automotive vehicle. Such control devices are to a great extent operating within an area of the transmission which is filled with a fluid medium. Also such control devices, especially because of their dimensional tolerances, are susceptible to becoming operationally fouled as by foreign matter carried by the fluid medium the pressure of which is being controlled or regulated by the pressure control device. Also, it has been discovered that gases, such as air, entrained in the fluid medium also form as pockets within the pressure control device and inhibit proper functioning of such pressure control device.

It has been proposed that a calibrated restricted flow passage be formed within the pressure control device whereby a small portion of the fluid medium being regulated is flowed into and through the electrical motor means of the pressure control device to thereby, in effect, wash foreign matter as into sump while permitting the fluid medium, as flows into the area of the electrical motor means, to purge air from such pressure control device The provision of such a calibrated restricted flow passage has, for the most part, greatly enhanced continued proper operation of such pressure control devices. The problems associated with a calibrated restricted flow passage include the relative difficulty of forming a passage having a diameter in the order of 0.006 to 0.008 inch. In some operating environments it was found that the particle size of the entrained or carried foreign matter was such as to actually flow through the calibrated restricted flow passage and into the area of the electrical motor means thereby presenting the opportunity for foreign particle fouling of the electrical motor means. In some situations it was found that foreign particles could become lodged within the calibrated restricted flow passage thereby reducing the flow of fluid medium therethrough to a rate less than desired. The forming of the calibrated restricted flow passage to be of even smaller diameter did not present a believed acceptable solution in that the resulting flow therethrough was less than desired and the possibility of having foreign particles become lodged therein still existed.

The invention as herein disclosed and described is primarily directed to the solution of the foregoing as well as other related and attendant problems of the prior art.

SUMMARY OF THE INVENTION

According to one aspect of the invention, a pressure regulating assembly for regulating the pressure of a flowing fluid medium, comprises housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially confined between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, fifth passage means for conveying only a portion of said fluid medium as flows through said fluid-flow passage means to said armature means and said pole piece means, wherein said fifth passage means is comprised of sintered material, and resilient means normally resiliently urging said spool valve in a direction generally toward further increasing communication between said annular chamber and said third fluid outlet passage means.

Various general and specific objects, advantages and aspects of the invention will become apparent when reference is made to the following detailed description considered in conjunction with the accompanying drawing.

BRIEF DESCRIPTION OF THE DRAWING

The single drawing, wherein for purposes of clarity certain details and/or elements may be omitted, is a generally axial cross-sectional view of a pressure regulating device employing teachings of the invention.

DETAILED DESCRIPTION OF THE PREFERRED EMBODIMENT

Referring in greater detail to the drawing a pressure regulating apparatus or assembly 10 is illustrated as comprising housing means 12 which, in turn, is shown as comprising housing portions or sections 14 and 16.

Housing section 14 may be considered as containing, and comprising, electromagnetic motor means 18. The electromagnetic motor means 18 is preferably comprised of a bobbin 20 having a generally tubular portion 22 with outwardly radiating axially spaced flange portions 24 and 26. An electrically energizable field coil 28, carried about tubular portion 22 and axially contained by and between flanges 24 and 26, has its conductor ends respectively connected to terminals or contacts 30 and 32.

The bobbin 20 is preferably formed of a dielectric plastic material and at its upper flange 24 provided with boss-like portions, one of which is typically shown at 34, which respectively receive and hold the terminals 30 and 32. In the embodiment shown such bosses are integrally formed with flange 24 in a manner as to be of the same radial distance but angularly spaced from each other.

A dielectric plastic ring-like member 36 has two inverted cup-like portions, one of which is typically shown at 38, which respectively receive the two boss-like portions. Each of the inverted cup-like portions is provided with a slot 40 for enabling the passage therethrough of the respective terminals 30 and 32.

An annular flange-like portion 42 of housing section or body 16 is received within and against the inner cylindrical surface of housing section or body 14. An annular or ring-like flux return member 44 is similarly received by housing body 14 and in axial abutment with flange 42 in a manner whereby a generally outer peripheral portion of a diaphragm 46 is sealingly retained therebetween. The flux return member 44 may be formed with an axially extending cylindrical passage 48 which closely receives an axially extending cylindrical pilot portion 50 of bobbin 20. Bobbin 20 is shown provided with an annular abutment shoulder for engaging an upwardly (as viewed in the drawing) directed annular abutment surface or shoulder 52 carried by flux return ring or member 44.

A ring-like or annular wave-type spring 54 is provided as to continually resiliently urge flux return member 44 and bobbin 20 in relatively opposite axial directions.

A cup-like cylindrical armature 56 is slidably received within an axially extending cylindrical inner surface or passage 58. The lower end of armature 56 is provided as with an axially extending cylindrical portion 60, of relatively reduced diameter, which is depicted as receiving thereabout the inner peripheral portion of diaphragm 46 which is retained thereon as by a pressed-on retainer ring.

A generally tubular cylindrical pole piece 62, closely received within cylindrical passage 58, is provided with outer thread means 64 for threadable engagement with cooperating internal threads 66 of an upper annular or ring-like flux member 68. As typically depicted at 70, the flux member 68 is provided with clearance-like passages or openings for the reception therein of the inverted cup-like portions one of which is typically shown at 38.

As can be seen, when the opposite end portions 72 and 74 of housing body 14 are formed over axially outer surfaces of upper flux ring 68 and flange portion 42 of housing body 16, the inner annular shoulder or abutment surface 76 of upper flux ring 68 is urged against bobbin body 20 (in the direction of flange portion 42) while the flange 42, through lower flux ring 44 and its shoulder or abutment surface 52, urges bobbin 20 in the opposite axial direction (generally toward upper flux ring 68) thereby containing such members or elements in axially assembled condition. If for some reason less than a totally axially abutting condition should occur, the wave spring 54 serves to assure that no relative axial movement will occur during operation as between and/or among flange 42, flux ring 44, bobbin 20 and upper flux ring 68 (and pole piece 62 threadably engaged with flux ring 68).

A combination flow member and adjustable spring seat member 80 is received within both a passage or chamber 78 of armature 56 and passage 82 of pole piece 62. Preferably, member 80 is closely piloted within passage 82, as by a coacting outer cylindrical portion, and provided with an externally threaded portion 84 coacting with an internally threaded portion 86 of pole piece member 62. Adjustable member 80 may be formed of non-magnetic stainless steel.

The lower end (as viewed in the drawing) of adjustment member 80 is provided with an axially extending pilot-like portion and an annular shoulder thereabout for operatively piloting and engaging the upper end of resilient means 88, such as a coiled compression spring, the lower end of which operatively engages an inner axial end wall or shoulder 79 of passage or chamber 78 as to thereby resiliently urge armature means 56 in a downward direction as viewed in the drawing.

An axially extending portion of adjustment member 80 is preferably made to provide for a controlled clearance with respect to the cylindrical inner surface of chamber 78. More particularly, in one embodiment of the apparatus 10, the total specified diametrical clearance as between the outer cylindrical portion 90, of member 88, and the juxtaposed inner cylindricial surface of chamber or passage means 78, ranged from 0.37 mm. to 0.49 mm. with the difference therebetween being allowable dimensional tolerance.

The upper end of adjustment means 80 is provided with socket-like tool-engaging surface means 92, whereby member 80 may be threadably axially adjusted relative to pole piece 62, while the tool-engaging surface means for pole piece 62 may take the form of a plurality of recesses 94—94 in the upper axial end thereof as to enable the engagement therewith of a spanner wrench, or the like, for the threadable axial adjustment of pole piece 62 relative to flux path member 68. Adjustment means 80 is also provided with transverse passage or conduit means 96 which serve to communicate as between the generally annular space, between pole piece end face means 98 and opposed armature end face means 100, and axially extending passage or conduit means 102. A ring-like or annular spacer 104 is situated in the space between opposed end faces 98 and 100 of pole piece 62 and armature 56, respectively and such spacer 104 is preferably formed of non-magnetic material as, for example, half-hard brass.

The lower axial end 79 (as viewed in the drawing) of armature means 56 has passage or conduit means 106 formed therethrough as to, generally, communicate from an area axially outwardly of extension 60 to the passage or chamber means 78 of armature 56.

Housing section or portion 16 is illustrated as comprising a housing body 112, of which flange portion 42 preferably comprises an integral portion, having an outer cylindrical surface 114 operatively received as in an inner cylindrical surface 116 of associated support structure 118 carried as by an automotive power transmission means 120. As illustrated, the body 112, of non-magnetic material, may have suitable flange means 122 by which the body 112 can be suitably secured to structure 118.

A spool valve member 124, preferably of aluminum alloy, having axially spaced first and second generally tubular valve portions 125 and 127 with outer cylindrical surfaces 126 and 128 respectively carried thereby, is slidably received within a cooperating passage comprising at least a first axially extending cylindrical surface 130 and a second relatively smaller axially extending cylindrical surface 132 which may be considered as being in communication with each other. As shown, valve body portion 125 is closely slidably received within passage portion 130 while valve body portion 127 is closely slidably received within passage portion 132.

Valve body portions 125 and 127 are joined to each other by an axially extending intermediate body portion 134. Preferably, body portion 134 has a cylindrical outer surface of generally reduced diameter, or diameters, thereby forming, in combination with passages 130 and 132, annular chamber or passage means 136. Spool valve member 124 is provided with axially extending passage or conduit means 138 effectively communicating with a recess or cavity 140, formed axially into valve body portion 125, and a calibrated flow restriction 142 which communicates, as through a conduit portion 144, with an annular circumferentially formed recess or groove 146.

A generally cylindrical valve seat or poppet valve seat member 148, preferably of non-magnetic stainless steel, is sealingly pressed into a recess 150 in valve housing or body 112. In the embodiment shown, a chamber 152 is formed as to be axially of valve body portion 125 and larger in diameter than the outer cylindrical surface 126 of valve body portion 125. A passage or aperture 154, generally centrally formed through valve seat member 148, communicates with chamber or cavity 152 and cavity 140. When the apparatus 10 is in a condition wherein the armature 56 is in its down-most position (as viewed in the drawing), an annular valving surface 156, formed generally circumferentially about passage or conduit means 106 and carried by armature means 56, sealingly abuts against a cooperating valve seating surface 158 of valve seat means 148.

A chamber 160 is formed generally between diaphragm means 46 and the flange (42) end of housing section means 16. A plurality of apertures or passages 162, formed in housing section 16, serve to communicate between chamber 160 and an area of relatively low reference or sump pressure, $P_s$. For purposes of disclosure, it may be assumed that the apparatus 10 and related cooperating support structure 118 are situated as to be generally surrounded by a relatively low reference, or sump, fluid pressure, $P_s$.

A first recess or groove 164 is formed circumferentially into the outer surface 114 of housing portion 112 while a second recess or groove 166 is formed circumferentially into inner passage 132. A plurality of generally radially extending passages or conduits 168 serve to complete communication between recesses or grooves 164 and 166. A relatively high pressure source or supply means 170, for supplying a fluid at a relatively high pressure, is in communication with annular groove or flow path 146 as via inner annular groove 166, conduit means 168, annular groove or recess 164 and conduit or passage means 172.

Similarly, an annular groove or recess 174 is formed generally peripherally into the outer surface 114 and is placed into communication with inner space or chamber means 136 as by a plurality of conduits or apertures 176. A control means 178 to be acted upon by fluid pressure, regulated or determined by valving means 124, is in communication with chamber 136, conduits or passages 176 and recess or flow ring 174 as via conduit or passage means 180.

A further annular groove or recess 182 is formed generally peripherally into the inner surface 130, of housing body 112, and placed into communication with said area of sump pressure as by conduit or passage means 184.

An end cap member 186, of generally disc-like configuration, is retained as within a bore formed in the lower end (as viewed in the drawing) of housing section or body 112. An aperture or passage 188, formed through end cap member 186, completes communication as between the fluid of low or sump pressure and conduit portion 132 axially beyond the outer end of valving body 127.

A resilient means such as, for example, a coiled compression spring 190 is situated in the control chamber means 136 and normally resiliently urges the spool valve 124 upwardly (as viewed in the drawing) or toward poppet valve seat member 148.

OPERATION OF THE INVENTION

Generally, the pressure regulating valving assembly 10, controls and/or determines fluid output pressure, in response to an electrical current, as by returning a portion of such fluid to, for example, sump. More particularly, an electrical signal, in which the magnitude of the current may be an indication of a sensed condition or an indication of the then desired operation of the control means 178, is applied to the field winding 28, as by terminals 30 and 32. This, in turn, creates a magnetic field with the path of the resulting flux being generally axially through pole piece 62, through flux ring or member 68, through housing section 14, through flux member 44, generally axially along armature means 56 and back to the pole piece means. The calibrated spring means 88 resiliently resists the movement of armature means 56 away from valve seat member 148; however, generally, the greater the magnitude of the electrical current applied to the field coil means 28 the further will armature means 56 move, away from valve seat member 148, against the resilient resistance of spring means 88. The spring means 88 may be adjusted, via adjustment means 80, as to apply an initial biasing force tending to maintain armature means 56 seated against valve seat member 148, thereby requiring a corresponding or related predetermined magnitude of electrical current to be first applied to field coil means 28 before the armature means 56 undergoes any opening movement with respect to valve seat member 148.

For ease of disclosure and understanding, the magnitude of the pressure of fluid provided by supply means 170 may be considered as being of constant relatively high magnitude, $P_1$. Assuming that armature means 56 is held against valve seat member 148, it can be seen that fluid at a supply pressure $P_1$ will flow into recess or groove 146, through conduit 144 and calibrated flow restriction 142, into passage or conduit means 138, into chamber or cavity 140 and into the chamber means 152. Some of such fluid flows into passages or conduits 154 and 106 with a small portion flowing through a calibrated flow restriction means 108. As a consequence, the magnitude of fluid pressure in chamber 152, cavity or chamber 140, and conduits or passages 138 is at its maximum while the opposite end, valve body portion 127, is exposed to the low sump pressure $P_s$. This, in turn causes the spool valve member 124 to axially move a maximum distance, against the resistance of spring means 190, thereby assuredly terminating communication as between control chamber 136 and conduit means 184 while, simultaneously, opening communication as between recess means 166 and control chamber 136. The magnitude of the fluid pressure within control chamber 136 increases to its maximum value causing $P_c$ to approach the value of $P_1$.

The various clearances in the electromagnetic motor means 18 are filled with fluid. In order to continually assure that all air is purged, fluid is flowed through calibrated flow restriction means 108 and into the chamber within armature means 56.

As previously indicated, there is a calculated, very small annular passageway between the outer surface of cylindrical portion 90 and the juxtaposed portion of spaced inner cylindrical surface 78. The restrictive effect thereof, to flow of fluid therethrough, is such as to preferably provide a rate of flow just slightly less than the rate of flow through said calibrated flow restrictive means 108. The fluid flowing through the tubular-like flow passage, between 90 and 78, flows into the annular space generally between opposed faces 98 and 100 and flows into the space between the outer cylindrical surface of armature means 56 and the juxtaposed inner cylindrical surface 58 of bobbin means 20. Because of the movement which armature means 56 undergoes, relative to bobbin means 20, the fluid therebetween generally circulates and eventually flows to sump as via radial passage means 96 and axial passage means 102, as well as the tool engaging socket 92. Such circulation of fluid results in the continuing assurance that any pockets of air, which may occur, are purged to sump and that there is a continuing out-flow of fluid from within the confines of housing 14 to the area or chamber of sump.

When the magnitude of the electrical current applied to the field coil means 28 becomes sufficient to have the magnetic force of the generated flux overcome the pre-load of spring means 88, the armature 56 will start to move toward pole piece means 62 and as this occurs, the valving end surface 156 moves away from valve seating surface 158 of valve seat member 148. The magnitude of the electrical current necessary to thusly overcome the pre-load of spring 88 may be considered to be a "threshhold" value or magnitude of current. As should now be evident, the greater the magnitude of the current, the more armature means 56 moves away from valve seat member 148 and toward pole piece means 62. As the armature means 56 undergoes such motion, fluid flows out of passage means 154, between spaced surfaces 156 and 158 and into chamber 160 which is at or very close to sump pressure, $P_s$. Such fluid is then able to pass through conduit means 162—162. As a consequence, the magnitude of the pressure of fluid in chamber 152, chamber or cavity 140, and passages 138 decreases because of the restriction 142 and the relatively less restricted flow out of passage 154. This, in turn, enables the biasing resilient means 190 to move spool valve 124 upwardly (as viewed in the drawing) opening or further increasing communication as between control pressure chamber 136 and bypass-like passage means 182, 184 to sump, while communication as between annulus 166 and control chamber 136 is being reduced by the cylindrical surface 128.

That is, the valving assembly preferably employs a poppet orifice 154, in series with a fluid feed or supply restriction 142, to vary a pressure which acts directly on the spool valve 124. A regulating poppet valve 156 is employed to vary the magnitude of the fluid pressure at the poppet orifice means 154.

The poppet regulating valve 156 may, in fact, be positioned some small distance, for example 0.005 inch, away from the poppet valve seat surface 158 and, depending upon such distance, fluid flow is restricted across seating surface means 158 which, in turn, creates a back pressure at poppet orifice means 154 with such back pressure being transmitted to chamber 152, cavity or passage means 140 and passage means 138 of spool valve 124.

Fluid at a supply pressure, $P_1$, is fed as through conduit means 172, through annulus 164, conduit means 168, annulus 146, and, through calibrated restriction means 142 to spool valve 124 passage and/or chamber means 138 and 140. As the magnitude of the fluid pressure within 138, 140 and 152 thusly increases, the spool valve 124 experiences an increasing axially directed force which is in a direction opposed to by spring means 190.

When such a hydraulic force axially against spool valve 124 becomes sufficient to overcome the force of spring 190, the spool valve 124 will begin to move axially away from poppet valve seat member 148 and toward end cap member 186 and exhaust port or passage 188. Such movement by spool valve 124, toward exhaust port 188, causes the supply port regulating surface 113, which comprises a portion of the outer cylindrical surface 128, to effectively decrease thereby allowing more fluid, at $P_1$, to flow out of annulus 166 and into control chamber 136. Simultaneously, as regulating surface 113 is thusly decreasing, the exhaust port regulating surface 115, which comprises a portion of the outer cylindrical surface 126, increases and increasingly restricts fluid flow out of control chamber 136 and into annulus 182 and exhaust passage or conduit means 184 to sump. The combination of the extra flow of fluid into control chamber 136 and the reduction of fluid flow out of control chamber 136 and into exhaust passage means 184 will create a magnitude of control pressure within control chamber 136 which will act upon the spool valve 124 and bring the spool valve 124 to a condition of rest with the various hydraulic forces and spring force being in equilibrium.

The difference in the diametrical dimensions of spool valve cylindrical portions 126 and 128 enables the spool valve 124 to achieve a state of equilibrium with a magnitude of fluid pressure in control chamber 136 greater than the then magnitude of fluid pressure in cavities or chambers 152, 140 and 138. It should be clear that although the spool valve 124 is depicted with valve portions having substantially different outer diametrical dimensions, the invention is not so limited.

During operation, regardless of whether the valving surface 156 is closed against seating surface 158 or if surface 156 is in its furthermost position away from seating surface 158, a relatively small rate of fluid medium will always flow through flow restriction means 108. As previously indicated such flow through restriction means 108 results in the flow of fluid medium as between juxtaposed relatively movable surfaces of armature means 56 and bobbin portion 22 thereby providing a lubricating quality therebetween. Further, in the preferred embodiment the restrictive effect to flow presented by juxtaposed surfaces 90 and 78 is such as to have the rate of flow of fluid medium therepast, and through passage means 102, 92 to sump, slightly less than the rate of flow through restriction means 108.

In the preferred embodiment, flow restriction means 108 is comprised of material having porosity such as to provide a desired rate of flow of fluid medium therethrough. In one embodiment of the invention the flow restriction means 108 had a flow rating wherein the porosity of the restriction means 108 was such that the air flow through the restriction means 108 into a 22.75 cubic inch volume evacuated to more than 16.0 inches of mercury vacuum would fill the volume from 16.0 inches vacuum to 8.0 inches vacuum in not less than 8.0 seconds or more than 12.0 seconds. The restriction means 108, although capable of being made from other materials, is preferably comprised of sintered stainless steel and is pressed as into conduit portion 106.

Certain important advantages are obtained as a consequence of forming the flow restriction means 108 of sintered porous material. For example, the voids forming the porosity are so small that for all practical purposes any particles of foreign matter, carried by the fluid medium, are physically much too large to gain entry into such voids. Further, in the remote event a particle of foreign matter should enter one of the voids, comprising the porosity, such would constitute a blockage to flow which would be a very minute percentage of the total area, of the means 108, available for flow, thereby not having a deleterious effect on the purpose and functioning of flow restriction means 108.

Particles of foreign matter, carried by the fluid medium, will come in contact, with what may be considered, the upstream end 107 of the flow restriction means 108. However, the flow of fluid medium will, in effect, continually wash such particles of foreign matter off of and away from upstream end 107 of flow restriction means 108. In view of the foregoing, it should be apparent that means 108 serves the functions of being both a fluid flow restrictor and a filter.

Although only a preferred embodiment of the invention has been disclosed and described it is apparent that other embodiments and modifications of the invention are possible within the scope of the appended claims.

What is claimed is:

1. A pressure regulating assembly for regulating the pressure of a flowing fluid medium, comprising housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially confined between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, fifth passage means for conveying only a portion of fluid medium as flows through said fluid-flow passage means to said armature means and said pole piece means, wherein said fifth passage means is comprised of sintered material, and resilient means normally resiliently urging said spool valve in a direction generally toward further increasing communication between said annular chamber and said third fluid outlet passage means.

2. A pressure regulating assembly according to claim 1 wherein said armature means comprises first and second axial ends, wherein said first axial end comprises said armature end face portion, and wherein said fifth passage means extends through said second axial end of said armature means.

3. A pressure regulating assembly according to claim 1 wherein said sintered material comprises sintered metal.

4. A pressure regulating assembly according to claim 1 wherein said sintered material comprises sintered stainless steel.

5. A pressure regulating assembly according to claim 1 and further comprising movable wall means operatively connected to said armature means as to be movable in unison with said armature means, wherein said movable wall means serves to generally separate said electrical field coil means said pole piece means and at least a major portion of said armature means from said second housing portion and said spool valve means, and wherein fluid flow communication is established as between opposite sides of said movable wall means by said fifth passage means.

6. A pressure regulating assembly according to claim 1 wherein said armature means comprises first and second axial end portions, wherein said first axial end portion comprises said armature end face, diaphragm means having an outer peripheral portion held and retained by said housing means, said diaphragm means comprising a generally inwardly situated peripheral portion operatively connected to said armature means at a location thereof at least near said second axial end portion, and wherein said fifth passage means extends through said second axial end portion.

7. A pressure regulating assembly according to claim 1 wherein said armature means comprises first and second axial end portions, wherein said first axial end portion comprises said armature end face, generally annular diaphragm means comprising a generally radially outer peripheral portion and a generally radially inner peripheral portion, wherein said outer peripheral portion is retained against relative movement by said housing means, wherein said inner peripheral portion is operatively connected to said armature means as to be at least near said second axial end portion and movable in unison with said armature means, and wherein said fifth passage means extends generally through said second axial end portion of said armature means and is generally circumscribed by said radially inner peripheral portion.

8. A pressure regulating assembly according to claim 1 and further comprising second resilient means normally urging said armature means toward said valve seat.

9. A pressure regulating assembly according to claim 1 wherein said sintered material is press-fit into a receiving aperture carried by said armature means.

10. A pressure regulating assembly for regulating the pressure of a flowing fluid medium, comprising housing means, said housing means comprising a first housing portion and a second housing portion, electrical field coil means carried by said first housing portion, pole piece means situated generally within said field coil means, a valve seat, fluid-flow passage means formed as to be generally circumscribed by said valve seat, said pole piece means comprising a pole piece end face portion, armature means at least partly situated generally within said field coil means, said armature means comprising an armature end face portion, wherein said armature means is situated with respect to said pole piece means as to thereby cause said armature end face portion to be juxtaposed to said pole piece end face portion, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second axially aligned cylindrical valving portions, said spool valve means further comprising generally axially extending body means situated between and operatively interconnecting said first and second cylindrical valving portions, said generally axially extending body means being relatively small in transverse cross-section as to thereby define an annular chamber circumferentially between said axially extending body means and said cylindrical inner chamber and axially confined between said first and second generally cylindrical valving portions, first fluid inlet passage means formed in said second housing portion as to be generally juxtaposed to said first generally cylindrical valving portion for general control by said first valving portion, second fluid outlet passage means formed in said second housing portion as to communicate with said annular chamber, third fluid outlet passage means formed in said second housing portion as to be generally juxtaposed to said second generally cylindrical valving portion for general control by said second valving portion, fourth fluid passage means communicating between said first fluid inlet passage means and said fluid-flow passage means, wherein when said armature means is moved as to most restrict flow of said fluid medium out of said fluid-flow passage means the pressure of said fluid medium causes said spool valve means to move in a direction whereby said second valving portion at least further restricts flow of said fluid medium from said annular chamber and through said third fluid outlet passage means toward sump and said first valving portion reduces its restrictive effect to flow of said fluid medium through said first fluid inlet passage means and into said annular chamber and out of said second fluid outlet passage means to associated structure to be acted upon by said fluid medium, and fifth passage means for conveying only a portion of fluid medium as flows through said fluid-flow passage means to said armature means and said pole piece means, and wherein said fifth passage means is comprised of sintered material.

11. A pressure regulating assembly according to claim 10 wherein said armature means comprises first and second axial ends, wherein said first axial end comprises said armature end face portion, and wherein said fifth passage means extends through said second axial end of said armature means.

12. A pressure regulating assembly according to claim 10 wherein said sintered material comprises sintered metal.

13. A pressure regulating assembly according to claim 10 wherein said sintered material comprises sintered stainless steel.

14. A pressure regulating assembly according to claim 10 and further comprising movable wall means operatively connected to said armature means as to be movable in unison with said armature means, wherein said movable wall means serves to generally separate said electrical field coil means said pole piece means and at least a major portion of said armature means from said second housing portion and said spool valve means, and wherein fluid flow communication is established as between opposite sides of said movable wall means by said fifth passage means.

15. A pressure regulating assembly according to claim 10 wherein said armature means comprises first and second axial end portions, wherein said first axial end portion comprises said armature end face, diaphragm means having an outer peripheral portion held and retained by said housing means said diaphragm means comprising a generally inwardly situated peripheral portion operatively connected to said armature means at a location thereof at least near said second axial end portion, and wherein said fifth passage means extends through said second axial end portion.

16. A pressure regulating assembly according to claim 10 wherein said armature means comprises first and second axial end portions, wherein said first axial end portion comprises said armature end face, generally annular diaphragm means comprising a generally radially outer peripheral portion and a generally radially inner peripheral portion, wherein said outer peripheral portion is retained against relative movement by said housing means, wherein said inner peripheral portion is operatively connected to said armature means as to be at least near said second axial end portion and movable in unison with said armature means, and wherein said fifth passage means extends generally through said second axial end portion of said armature means and is generally circumscribed by said radially inner peripheral portion.

17. A pressure regulating assembly according to claim 10 and further comprising resilient means normally urging said armature means toward said valve seat.

18. A pressure regulating assembly according to claim 10 wherein said sintered material is press-fit into a receiving aperture carried by said armature means.

* * * * *